UNITED STATES PATENT OFFICE.

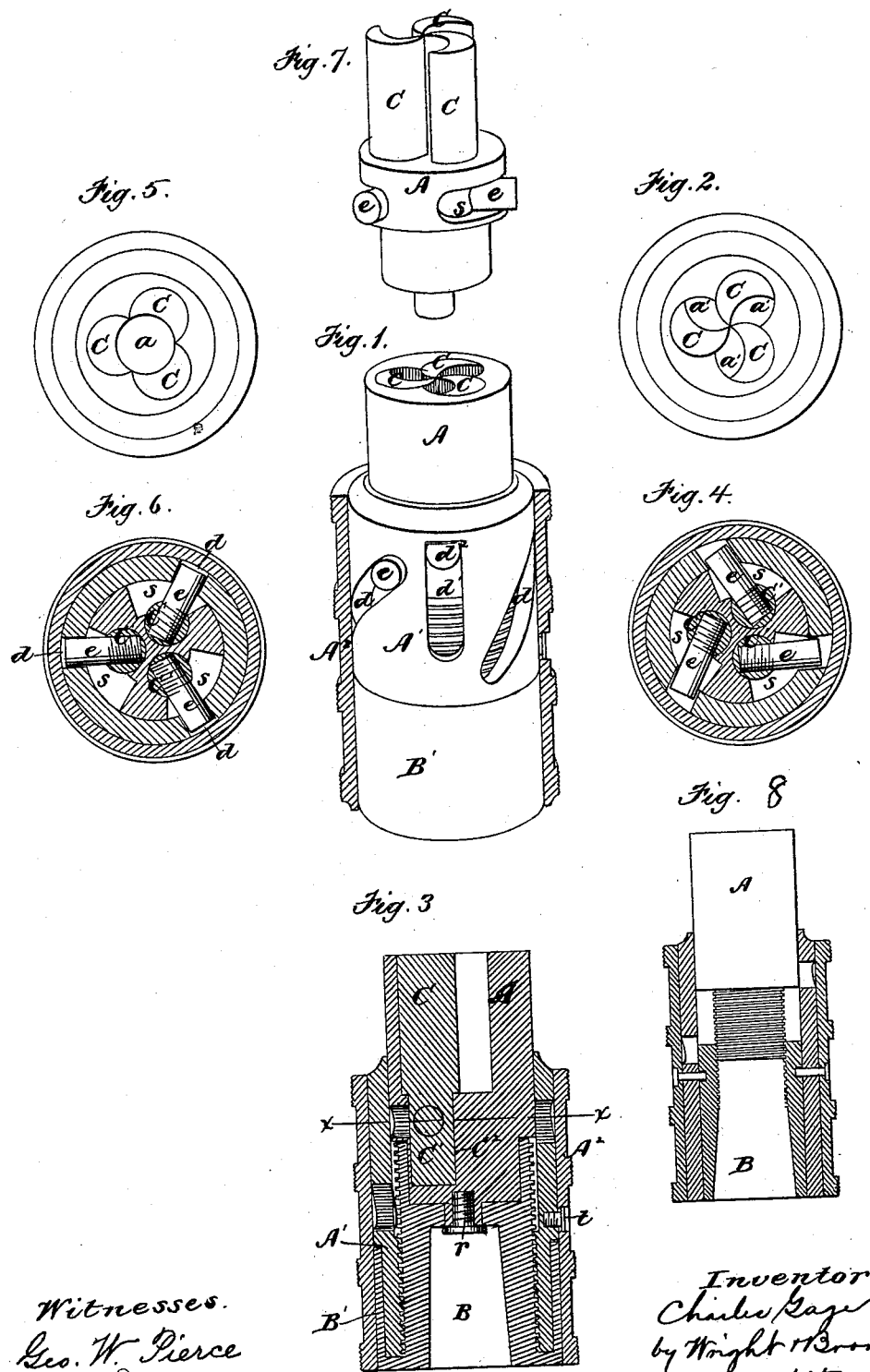

CHARLES GAGE, OF BOSTON, MASSACHUSETTS.

IMPROVEMENT IN CHUCKS.

Specification forming part of Letters Patent No. 210,415, dated December 3, 1878; application filed February 18, 1878.

*To all whom it may concern:*

Be it known that I, CHARLES GAGE, of Boston, in the county of Suffolk and State of Massachusetts, have invented certain Improvements in Chucks, of which the following is a specification:

This invention is an improvement upon Letters Patent No. 141,978, granted to Thomas R. Almond, August 19, 1873. In said patent a series of jaws are employed, which are crescent-shaped in cross-section—that is to say, partly cylindrical or convex on one side and concave on the other; and these jaws are adapted to have at once a longitudinal motion and a rotary motion on their own centers, in partly cylindrical recesses formed in an inclosing-shell, and merging together therein, the longitudinal motion being imparted by a screw or threaded bolt working in the interior of the shell, and the rotary motion by stationary guides or pins passing laterally into the shell and entering spiral grooves in the cylindrical sides of the jaws. The rotary motion of the jaws causes the griping or biting angles thereof to move in unison toward and away from a center, which is common to all the griping-angles, and is also the center of a tool-receiving space, said angles coming to a bearing simultaneously on a drill placed in said space.

My invention has for its object to remedy certain defects in the construction of Almond's chuck, said defects being as follows: First, the manner in which the jaws are connected to the screw or bolt by which they are moved longitudinally is such that said jaws are supported laterally at their inner ends only at one side, so that when they are turned to cause their griping-angles to project toward the center of the tool-receiving space, as in grasping a small-sized drill, they are not supported on their inner sides, and, consequently, when so turned the upper jaw or jaws in the chuck are liable to drop or wabble, and thus get out of their proper positions relatively to each other and the tool-receiving space; second, the guiding-pins whereby the jaws are rotated (in connection with spiral grooves) are attached to the inclosing-shell, and do not move with the jaws, and consequently said pins are not available to steady or support the jaws laterally, excepting when two pins are used for each jaw, and then only to a slight extent, this construction necessitating the formation of two spiral grooves in each jaw, and involving considerable care in properly centering the jaws; third, the longitudinal movement of the jaws causes their outer ends to project beyond the end of the inclosing-shell when they are adjusted to hold a small-sized drill, so that they are not backed or supported outwardly at their outer ends when thus adjusted; fourth, the threaded bolt that gives the jaws their longitudinal motion works in and out of the inclosing-shell, and more or less of its threaded periphery is exposed, and as said periphery is usually lubricated, particles of iron, dust, &c., are liable to collect thereon and work in between the bolt and its socket, and thus obstruct the working of the bolt, and cause wear and friction on the threads.

My invention consists in the construction and combination of parts whereby the above-recited objections are obviated, as I will now proceed to describe, and point out in my claims.

Of the accompanying drawings, forming a part of this specification, Figure 1 represents a perspective view of a chuck embodying my invention, showing the jaws closed or turned into the center of the tool-receiving space. Fig. 2 represents an end view of the same. Fig. 3 represents a longitudinal section of the same. Fig. 4 represents a transverse section on line *x x*, Fig. 3. Fig. 5 represents an end view of the chuck, showing the jaws open or turned out from the tool-receiving space. Fig. 6 represents a transverse section of the chuck through the inner ends of the jaws, when the same are in the position shown in Fig. 5. Fig. 7 represents a perspective view of the jaw-carrier, and its jaws detached from the shell in which they move, the carrier being modified in form. Fig. 8 represents a longitudinal section, showing modification.

In carrying out my improvements I construct the jaws C at their outer ends in the same manner that they are constructed in the Almond patent; but instead of connecting their inner ends directly to the screw or bolt whereby they are moved longitudinally, and arranging them to move longitudinally in the inclosing-shell A, I construct the shell to entirely back the entire length of the jaws, or nearly so, and to move longitudinally therewith, so that the jaws are not projected to any material extent from the shell at their outer ends at any part of their movement. To this end I make the inner ends, $C^1$, of the jaws cylindrical, and attach the guiding-pins $e$ directly to the cylindrical portions, and provide the shell A in its outer portion with the jaw-holding spaces $a'$, (located around a tool-holding space, $a$, as in the Almond patent,) and at its inner end with cylindrical sockets $C^2$, adapted to receive the ends $C^1$ of the jaws, lateral slots $s$ being formed in the shell through which the pins $e$ project, as shown in Figs. 4 and 6. The shell A is inclosed and adapted to move longitudinally without rotating in a tubular shell, $A'$, which is provided with three spiral slots, $d$, into which the pins $e$ project, as shown in Figs. 1, 4, and 6, and with a longitudinal slot, $d^1$, into which projects a pin or screw, $d^2$, which is rigidly attached to the shell A.

The tubular shell $A'$ is threaded internally at its inner end, and with this threaded portion engages a threaded bolt, B, that is free to rotate, and is provided at its inner end with a socket which receives the inner end of the shell A, said inner end being reduced in diameter, as shown in Figs. 3 and 7. The shell A is secured to the bolt B by means of a screw, $r$, as shown in Fig. 3, so that it will be moved longitudinally by said bolt without being rotated thereby.

$A^2$ represents a tubular casing, which incloses the shell $A^1$ and bolt B, and is rigidly attached to the former by a screw, $t$. The bolt B is provided at its rear end with an annular flange, $B'$, which is connected to the end of the bolt in any suitable manner, and forms an annular space around a portion of the threaded periphery of the bolt, said space receiving the reduced end of the tubular shell $A^1$, as shown in Fig. 3, the flange $B'$ being of the same diameter as the shell $A^1$, so that the flange will fit closely the interior of the casing $A^2$.

Operation: When the jaws C are in the position shown in Fig. 5, the shell A is entirely inclosed in the shell $A^1$, the outer ends of the two being flush, or nearly so, and the pins $e$ being in the inner ends of the spiral grooves $d$. Now, by turning the bolt B in the proper direction, the shell $A^1$ remaining stationary, the shell A will be moved outward by said bolt, but will be prevented from turning by the slot $d^1$ and pin $d^2$. This motion of the shell A causes the pins $e$ of the jaws to follow the spiral grooves $d$ of the shell $A^1$, the jaws being thereby caused to rotate in unison until their biting-edges are brought to bear upon a tool in the space $a$, or until said biting-angles meet, as shown in Figs. 1 and 2, the shell A being then projected to its extreme limit.

It will be seen that the jaws and shell move together longitudinally; therefore the jaws are supported at all times alike by the shell, their outer ends being backed or supported outwardly, and their inner or cylindrical ends being supported on all sides. Hence there can be no independent movement or displacement of either of the jaws, each being held positively and moved in exact unison with the others.

During the rotation of the jaws the pins $e$ move laterally in the slots $s$, which are of the necessary length to permit the pins to turn from the radial position they occupy when the jaws are open, as shown in Figs. 5 and 6, to the tangential position they occupy when the jaws are closed, as shown in Fig. 4. By means of the pins $e$ and slots $s$, the jaws are securely held against longitudinal displacement in the shell, as will be readily seen.

The flange $B'$ of the bolt B, in connection with the end of the shell $A^1$ which it covers, and the end of the shell $A^2$ which partially covers or incloses said flange, effectually excludes all dirt and foreign matter from the threads of the bolt and shell, the flange being so arranged that it will not uncover the end of the shell $A^1$, when the shell A and its jaws are retracted or drawn into the shell $A^1$ by turning back the bolt B.

Fig. 8 shows a modification of the means for moving the shell A and jaws C longitudinally. In this modification the inner end of the shell A is threaded on its periphery, and the bolt B is threaded internally, and the bolt B is connected to the shell $A^1$ and casing $A^2$ by pins $u$ $u$, which project into a groove in the bolt, the latter being thus adapted to turn in the shell $A^1$ without moving longitudinally, its rotary motion moving the shell A in or out.

If desired, the shell A may be cut off above the slots $s$, as shown in Fig. 7, so as to form only a bearing for the inner ends of the jaws.

I claim as my invention—

1. The shell A, having the jaw and tool-holding spaces or sockets, the lateral slots $s$ and the guiding-pin $d$, combined with the jaws C, having the fixed pins $e$ and the slotted shell $A^1$, adapted to guide the shell A and rotate the jaws C, substantially as described.

2. The shell A, provided with the pin $d^2$ and slot $s$, and carrying the jaws C, having the laterally-projecting pins $e$, in combination with the screw-threaded shell $A^1$, having the longitudinal slot $d^1$ and spiral slots $d$, and with the screw-threaded bolt B, all so arranged that a rotation of the bolt will project or retract the shell A without rotating it, and at the same time operate the griping-jaws C, to grasp or release the tool, substantially as described.

3. The bolt B, having the annular flange $B^1$, adapted to fit snugly within the outer shell or casing $A^2$, and prevent the access of dust, &c., to the screw-threaded portions of the bolt and shell $A^1$, respectively, at all times, substantially as described.

In testimony whereof I have signed my name to this specification in the presence of two subscribing witnesses.

CHARLES GAGE.

Witnesses:
R. A. BALLOU,
JAMES POPE.